(12) United States Patent
Dai et al.

(10) Patent No.: US 10,356,390 B2
(45) Date of Patent: Jul. 16, 2019

(54) RAPID THREE-DIMENSIONAL MICROSCOPIC IMAGING SYSTEM

(71) Applicant: Tsinghua University, Beijing (CN)

(72) Inventors: Qionghai Dai, Beijing (CN); Jijun He, Beijing (CN); Jiamin Wu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 156 days.

(21) Appl. No.: 15/459,623

(22) Filed: Mar. 15, 2017

(65) Prior Publication Data

US 2018/0210187 A1    Jul. 26, 2018

(30) Foreign Application Priority Data

Jan. 23, 2017   (CN) .......................... 2017 1 0050564

(51) Int. Cl.
*G02B 21/06*        (2006.01)
*H04N 13/204*       (2018.01)
*G02B 27/10*        (2006.01)
*G02B 21/36*        (2006.01)
*G02B 21/16*        (2006.01)
(Continued)

(52) U.S. Cl.
CPC ....... *H04N 13/204* (2018.05); *G02B 21/0004* (2013.01); *G02B 21/16* (2013.01); *G02B 21/361* (2013.01); *G02B 21/365* (2013.01); *G02B 27/0075* (2013.01); *G02B 27/106* (2013.01); *G02B 27/1086* (2013.01); *H04N 2213/001* (2013.01)

(58) Field of Classification Search
CPC .......... H04N 13/204; H04N 2213/001; G02B 21/365; G02B 21/0004; G02B 27/0075; G02B 21/361; G02B 27/1086; G02B 27/106; G02B 21/16
See application file for complete search history.

(56) References Cited

U.S. PATENT DOCUMENTS 6,239,909 B1 *  5/2001  Hayashi ................ G02B 21/00
                                                          359/558
7,729,049 B2 *  6/2010  Xu ........................ G02B 21/06
                                                          345/419
(Continued)

*Primary Examiner* — Howard D Brown, Jr.
(74) *Attorney, Agent, or Firm* — David D. Brush; Westman, Champlin & Koehler, P.A.

(57) ABSTRACT

The three-dimensional microscopic imaging system includes: a microscope; a field diaphragm; a narrow-band filter, configured to perform narrow-band filtering; a beam-splitting grating, configured to duplicate a beam into beams with different angles; a lens array with different focal length, configured to perform different phase modulation to each beam with different angles; a micro lens array, configured to modulate the beams with different angles that pass through the lens array with different focal length respectively to different spatial locations at a back focal plane of the micro lens array respectively; and an image sensor configured to record an image corresponding to the modulated beams at the back focal plane of the micro lens array. The system has a simple structure, a cheap cost, and a relatively weak exciting light, and is suit for living samples, and has the adjustable intervals of imaging depths.

11 Claims, 2 Drawing Sheets

(51) Int. Cl.
*G02B 27/00* (2006.01)
*G02B 21/00* (2006.01)

(56) References Cited

U.S. PATENT DOCUMENTS

| | | | | |
|---|---|---|---|---|
| 2008/0252977 | A1* | 10/2008 | Iwamoto | G02B 27/22 |
| | | | | 359/559 |
| 2011/0249866 | A1* | 10/2011 | Piestun | H04N 13/204 |
| | | | | 382/103 |
| 2012/0026311 | A1* | 2/2012 | Ouchi | G02B 21/06 |
| | | | | 348/79 |
| 2013/0100525 | A1* | 4/2013 | Chiang | G02B 21/082 |
| | | | | 359/385 |
| 2015/0015879 | A1* | 1/2015 | Papadopoulos | G02B 23/26 |
| | | | | 356/301 |
| 2016/0278637 | A1* | 9/2016 | Gao | A61B 3/14 |

\* cited by examiner

RAPID THREE-DIMENSIONAL MICROSCOPIC IMAGING SYSTEM

CROSS-REFERENCE TO RELATED APPLICATIONS

This Application claims priority to and the benefit of Chinese Patent Application No. 201710050564.X, filed Jan. 23, 2017, the content of which is incorporated herein by reference in its entirety.

FIELD

The present disclosure generally relates to a technical field of computational photography, and more particularly, to a rapid three-dimensional microscopic imaging system.

BACKGROUND

The research on life science and material science has brought higher requirements of three-dimensional microscopic imaging. In the related art, three-dimensional microscopic imaging technologies with a wide-field microscope are used for photosensitive fluorescence samples or biological samples. However there are problems: not only fluorescence signals of the sample on a focal plane of an objective lens are excited by the exciting light, but also fluorescence signals of the sample on planes out of the focus of the objective lens are excited by the exciting light, so that a light intensity of each pixel of an imaging sensor is a superposition of a fluorescence light intensity on the focal plane, a fluorescence light intensity on the planes out of focus and noise, and a resolution of the image on each depth may be lower. This three-dimensional microscopic imaging needs to scan the whole sample layer-by-layer to obtain a set of image sequences at different depths, and then noise is eliminated via computational methods and a three-dimensional structure of the sample is obtained through fuzzy reconstruction.

SUMMARY

The present disclosure aims to solve at least one of the problems existing in the related art to at least some extent.

A rapid three-dimensional microscopic imaging system is provided in embodiments of the present disclosure. The system includes: a microscope, configured to magnify a sample and to image the sample onto an image plane of the microscope so as to output from an output port of the image plane; a field diaphragm, disposed at an output image plane of the microscope and configured to restrict a field range of imaging; a narrow-band filter, disposed between lenses of a first stage 4f system behind the field diaphragm and configured to perform narrow-band filtering on information of the sample; a beam-splitting grating, configured to duplicate a beam after passing through the first stage 4f system into beams with different angles; a lens array with different focal lengths, disposed at a Fourier plane of a second stage 4f system, and configured to perform different phase modulation to each beam with different angle; a micro lens array, disposed at an image plane of the second stage 4f system and configured to modulate the beams with different angles that pass through the lens array with different focal length respectively to different spatial locations at a back focal plane of the micro lens array respectively; and an image sensor, disposed at an image plane of an imaging camera lens or an image plane of a third stage 4f system, and configured to record an image corresponding to the modulated beams at the back focal plane of the micro lens array.

Moreover, the rapid three-dimensional microscopic imaging system according to above embodiments of the present disclosure may also have the following additional technical features.

In some embodiments, the microscope is a wide-field microscope.

In some embodiments, the microscope is a wide-field fluorescence microscope.

In some embodiments, the beam-splitting grating and the narrow-band filter are coupled through the first stage 4f system, the narrow-band filter is configured to perform wave band interception and the beam-splitting grating is configured to perform beam information duplication.

In some embodiments, the beam-splitting grating is disposed at an image plane of the first stage 4f system.

In some embodiments, a distribution of the lens array with different focal length corresponds to a spatial location of the Fourier plane of the second stage 4f system.

In some embodiments, a fluorescence image output from the microscope is modulated via the micro lens array with a diffraction limit resolution.

In some embodiments, the system further includes: a reconstructing module, configured to obtain an imaging stack corresponding to each depth of the sample by extracting pixels of the image recorded by the image sensor, and to reconstruct a three-dimensional structure of the sample by using the imaging stacks.

In some embodiments, the first stage 4f system, the second stage 4f system, and the third stage 4f system have lenses or imaging camera lenses respectively.

In some embodiments, the image sensor is a Scientific Complementary Metal-Oxide-Semiconductor SCMOS monochrome sensor or Charge Coupled Device CCD sensor, or Complementary Metal-Oxide-Semiconductor CMOS sensor.

In some embodiments, the number of beams split by the beam-splitting grating is adjustable.

In some embodiments, the number of lenses of the lens array with different focal length matches to the number of beams split by the beam-splitting grating.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or other aspects and advantages of the present disclosure will become apparent and more readily appreciated from the following descriptions of the embodiments with reference to the drawings, in which.

DETAILED DESCRIPTION

Figure 1:
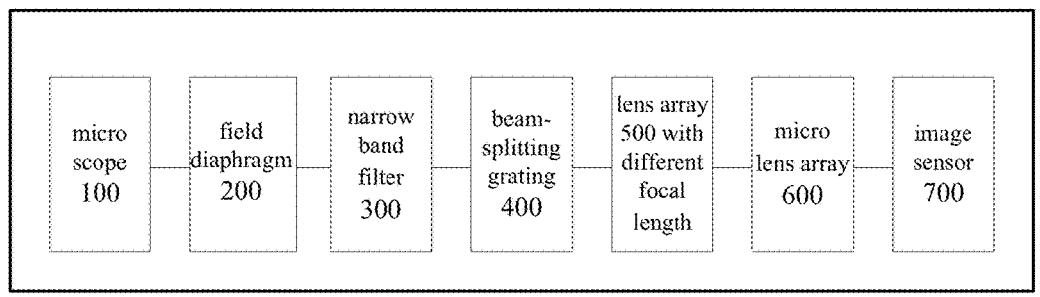
FIG. 1 is a block diagram showing a rapid three-dimensional microscopic imaging system according to embodiments of the present closure.

Reference will now be made in detail to exemplary embodiments, examples of which are illustrated in the accompanying drawings, wherein the same or similar elements and the elements having same or similar functions are denoted by like reference numerals throughout the descriptions. Embodiments described herein with reference to drawings are explanatory and used to generally understand the present disclosure, and shall not be construed to limit the present disclosure.

In the specification, it is to be understood that terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require the present disclosure to be constructed or operated in a particular orientation, thus cannot be seen as restrictions on the present disclosure. In addition, terms such as "first" and "second" are used herein only for purposes of description and are not intended to indicate or imply relative importance or significance or to imply the number of indicated technical features.

It should be noted that in the description of the present invention, unless specified or limited otherwise, the terms "mounted," "connected," "coupled" and the like are used broadly, and may be, for example, fixed connections, detachable connections, or integral connections; may also be mechanical or electrical connections; may also be direct connections or indirect connections via intervening structures; may also be inner communications of two elements. The particular meanings of above terms can be understood by those skilled in the art according to specific situations.

A rapid three-dimensional microscopic imaging system according to embodiments of the present closure will be illustrated with reference to drawings as follows.

FIG. 1 is a block diagram showing a rapid three-dimensional microscopic imaging system according to an embodiment of the present closure. As shown in FIG. 1, the rapid three-dimensional microscopic imaging system includes a microscope 100, a field diaphragm 200, a narrow-band filter 300, a beam-splitting grating 400, a lens array 500 with different focal length, a micro lens array 600, and an image sensor 700.

In detail, the microscope 100 is configured to magnify a sample (such as a microscopic sample) and to image the sample onto an image plane of the microscope so as to output from an output port of the image plane.

In an embodiment of the present disclosure, the microscope 100 is a wide-field microscope. The microscope 100 may realize a primary stage magnification of the sample.

In an embodiment of the present disclosure, the microscope 100 is a wide-field fluorescence microscope so as to realize a primary stage magnification of the fluorescence sample.

Further, the microscope 100 may export or output an image plane of the sample through the output port for further processing at posterior stages.

The field diaphragm 200 is disposed at an output image plane of the microscope 100 and configured to restrict a field range of imaging at the posterior stages.

The narrow-band filter 300 is disposed between lenses of a first stage 4f system behind the field diaphragm 200 and is configured to perform narrow-band filtering on the information of the sample. In other words, after passing through the narrow-band filter 300, only information with narrow band (s) may pass through, thereby solving a problem of dispersion that may be caused by the beam-splitting grating 400 that is behind the narrow-band filter 300. It should be noted that, in an actual imaging optical path, a position of the narrow-band filter 300 is not strictly limited, i.e. the position thereof is adjustable.

In detail, the 4f system (such the first 4f system, a second 4f system and a third 4f system that are described in the followings) includes, for example, two lenses or two camera lenses (which also may be called as a primary stage lens and a secondary stage lens). A back focal plane of the primary stage lens coincides with a front focal plane of the secondary stage lens. When an image plane of the imaging optical path is on a front focal plane of the primary stage lens, a magnified or minified image plane will occur on a back focal plane of the secondary stage lens. The magnified or minified ratio of the image plane is determined by a ratio between the focal length of the primary stage lens and the focal length of the secondary stage lens.

The beam-splitting grating 400 is configured to duplicate a beam after passing through the first stage 4f system into beams with different angles.

In an embodiment of the present disclosure, the beam-splitting grating 400 and the narrow-band filter 300 are coupled through the first stage 4f system. The narrow-band filter 300 is configured to perform wave band interception and the beam-splitting grating 400 is configured to perform beam information duplication.

In an embodiment of the present disclosed, the beam-splitting grating 400 is disposed at an image plane of the first stage 4f system.

The lens array 500 with different focal length is disposed at a Fourier plane of the second stage 4f system and is configured to perform different phase modulation to each beam with different angle, i.e. causing different beams to be focused to different axial positions. In particular, that is to use the lens array 500 with different focal length to perform different phase modulation to the duplicated beams on the Fourier plane.

In an embodiment of the present disclosure, in order to perform different phase modulation to each beam, a distribution of the lens array 500 with different focal length strictly corresponds to a spatial location of the Fourier plane of the second 4f system.

The micro lens array 600 is disposed at an image plane of the second stage 4f system and is configured to modulate the beams with different angles that pass through the lens array 500 with different focal length to different spatial locations at a back focal plane of the micro lens array respectively, in which each beam with the different angle passed through the beam-splitting grating 400 and the lens array 500 with different focal length respectively. In particular, since beams for imaging in different depths are varied with angles, the information corresponding to the different depths is modulated to the different spatial locations of the sensor respectively via the micro lens array 600, thereby achieving simultaneous imaging in the different depths.

In an embodiment of the present disclosure, a fluorescence image output from the microscope 100 is modulated via the micro lens array 600 with a diffraction limit resolution or other intensity or other phase.

The image sensor 700 is disposed at an image plane of an imaging camera lens or an image plane of the third stage 4f system and is configured to record an image corresponding to the modulated beams at the back focal plane of the micro lens array, in which the image is modulated at the prior stages as above. In other words, the image sensor 700 and the micro lens array 600 are coupled through the third stage 4f system or the imaging camera lens, and are configured to image all the beams modulated by the prior stages simultaneously.

In an embodiment of the present disclosure, the image sensor 700 may be, for example, an SCMOS (Scientific Complementary Metal-Oxide-Semiconductor) monochrome sensor or CCD (Charge Coupled Device) sensor, or CMOS (Complementary Metal-Oxide-Semiconductor) sensor or other types of imaging sensors.

In an embodiment of the present disclosure, the above first stage 4f system, second stage 4f system and third stage 4f system are, for example, lenses or imaging camera lenses. That is to say, the 4f systems at all stages for coupling may be achieved by the lenses, and also by the imaging camera lenses.

In an embodiment of the present disclosure, in order to ensure the image plane to be sampled in a diffraction limit resolution, magnifications and numerical apertures of optical elements in all the 4f systems may need to be matched correspondingly.

Embodiments of the present disclosure are generally related to narrow-band imaging, thus the narrow-band filter needs to be introduced into the imaging optical path, and accordingly the problem of dispersion caused by the beam-splitting grating is solved.

In an embodiment of the present disclosure, the number of beams split by the beam-splitting grating 400 is adjustable. Accordingly, the number of lenses of the lens array 500 with different focal length matches to the number of beams split by the beam-splitting grating 400. For example, the beam-splitting grating 400 may split a beam of incident light into beams of 5*5 dimensions. In practice, a design of the beam-splitting grating 400 may be adjusted according to requirements, such as to increase or decrease the number of split beams or change the spatial distribution. Accordingly, for example, in order to be a match with the beam-splitting grating 400, the 500 lens array with different focal length may also use a 5*5 lens array with different focal length.

Furthermore, in an embodiment of the present disclosure, the system, for example, may also include a reconstructing module (not shown in the figures). With a picture taken by one-time shot, pixels at a same relative location behind each micro lens may correspond to imaging results of a same depth of the sample. The reconstructing module may obtain a set of imaging stacks of the sample by extracting pixels out of the image recorded by the image sensor 700, in which each imaging stack corresponds to each depth, and then may reconstruct a three-dimensional structure of the sample by using the imaging stacks, thus influences of signals on planes out of the focus may be eliminated and a three-dimensional reconstruction of the sample is achieved based on the imaging stacks.

In specific embodiments, the computational reconstruction process of the reconstructing module may be realized on hardware systems such as a common PC or a workstation.

In specific embodiments, since the narrow-band filter is used, the rapid three-dimensional microscopic imaging system according to embodiments of the present disclosure may be suitable for both the fluorescence sample imaging and the bright field microscopic imaging.

In other words, the rapid three-dimensional microscopic imaging system according to embodiments of the present disclosure generally includes two parts: an image acquisition part and a computational reconstruction part.

In detail, the image acquisition part mainly includes the microscope, the narrow-band filter, the beam-splitting grating, the lens array with different focal length, and the micro lens array, and the image sensor. The beam-splitting grating may realize the beam information duplication via the image plane modulation. The lens array with different focal length may perform different phase modulation on the Fourier plane of the duplicated beams respectively, so as to image the sample in different depths via different angles simultaneously to the micro lens array at the posterior stage. The micro lens array may modulate beams with different angles on an image plane to different pixels of the image sensor behind the micro lens array.

The computational reconstruction part may use the acquired image information in different depths to make the computational reconstruction of the sample.

Comparing to other imaging methods, advantages of the embodiments of the present disclosure are that imaging the sample in the different depths may be realized via just one shot, so that the imaging speed is high. Further, the embodiments of the present disclosure are suitable for living samples. Comparing to multi-focal grating methods, the structure of the system in the embodiments of the present disclosure may be simple and the intervals of imaging depths are easy to adjust.

As an example, a principle of the system according to embodiments of the present disclosure may be summarized as: using a high magnification objective lens of the wide-field microscope, adding the beam-splitting grating on an output fluorescence image plane of the sample, then performing phase modulation on the Fourier plane, further transmitting the beams through the micro lens array with the limit resolution and achieving beams of different angles to correspond to different depths of the sample after the modulation of the micro lens array, after that, adjusting pixel ranges corresponding to each micro lens on the image sensor to make the image sensor to obtain the image in the different depths simultaneously, and then using the computational method to eliminate the influence of information out of the focal plane and reconstruct the three-dimensional structure of the sample. The system may include a relatively weak exciting light, so that the system is suitable for imaging photosensitive samples and biological samples, thereby reducing damages of fluorescence bleaching to the samples; the system may also be with a high image resolution, and the system may further be with a fast imaging speed, in which simultaneously imaging in multiple depths may be realized at a speed same to which of a single imaging of the normal wide-field microscope.

In summary, with the rapid three-dimensional microscopic imaging system according to embodiments of the present closure, a simple structure and a cheap cost may be achieved, meanwhile, a relatively weak exciting light is required for imaging a fluorescence sample, and damages to photosensitive samples and biological samples may be reduced as far as possible; moreover, the system doesn't need to scan point-by-point during imaging process, thus the imaging speed is fast and the image resolution is high.

Figure 2:
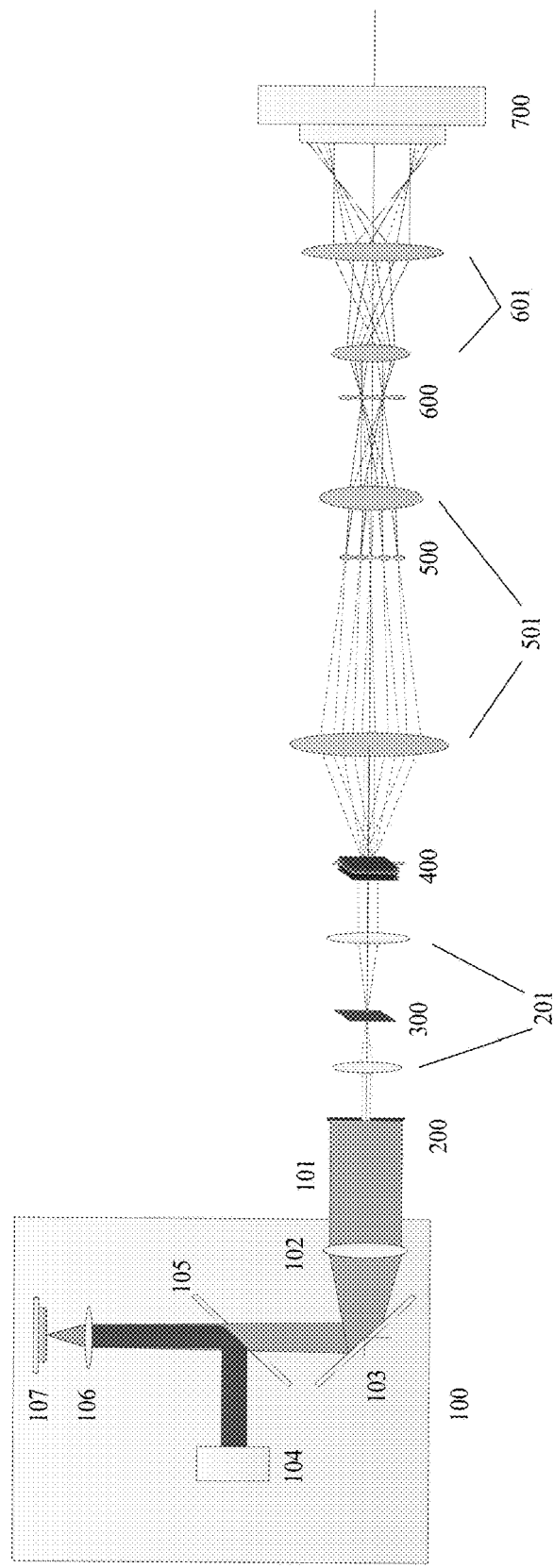
FIG. 2 is a schematic diagram illustrating an imaging optical path of a rapid three-dimensional microscopic imaging system according to embodiments of the present closure.

In order to make the embodiments of the present disclosure easier to appreciate, further detail descriptions of the rapid three-dimensional microscopic imaging system according to embodiments of the present closure will be illustrated according to a particular embodiment with reference to FIG. 2.

In this embodiment, with reference to FIG. 2, the system includes a microscope 100, a field diaphragm 200, a narrow-band filter 300, a beam-splitting grating 400, a lens array with 500 different focal length, a micro lens array 600, and an image sensor 700.

In detail, with reference to FIG. 2, a sample 107 is on a focal plane of a microscopic objective lens 106 of the microscope 100. Lasers from a laser source 104 may be reflected by a dichroic mirror 105 and then focused by the objective lens 106, so as to excite fluorescence signals of the sample 107. The fluorescence signals pass through the objective lens 106 and the dichroic mirror 105 and then are reflected by a reflector 103 and are imaged on an image plane output port 101 through a tube mirror 102. The field diaphragm 200 is provided on an image plane to restrict a field so as to make the system easy to adjust. The above elements are further followed by and connected to the beam-splitting grating 400 via a first stage 4f system 201. In order to solve a dispersion problem of the beam-splitting grating 400, the narrow-band filter 300 is provided in the between lenses of the first stage 4f system 201. After passing through the beam-splitting grating 400, the original light beam may be split into beams of 5*5. The 25 beams are separated in the Fourier plane. The beams are then adjusted by a second stage 4f system 501 and transmitted to the micro lens array 600. In order to make beams corresponding to different depths can be imaged on a back focal plane of the second stage 4f system 501 simultaneously, different phase modulations are performed for different beams on a Fourier plane in the middle of the second stage 4f system 501. In this embodiment, a 5*5 lens array with different focal length is used. Each beam is modulated by a specific lens with a different focal length of the corresponding lens in the array 500 Since imaging in different depths come from the modulated beams of different angles, these beams corresponding to different angles are further separated by the micro lens array 600 on the image plane. These beams are mapped to different spatial positions according to their different angles. Then their magnification factors may be adjusted by a third stage 4f system 601, and then each micro lens may correspond to 5*5 pixels on the image sensor. Therefore beams with different angles may correspond to different spatial locations on the image sensor, thus acquiring and sampling in different depths simultaneously may be achieved. The image sensor 700 is at a location of the focal length of one micro lens away after an image plane of the third stage 4f system 601, so as to achieve that information corresponding to different depths may exactly match to certain pixels after the micro lenses.

In this embodiment, the above microscope 100 may be a traditional commercial microscope, also, a positive position microscope or an inverted microscope chosen according to different applications. The embodiments of the present disclosure do not limit to the positive position microscope shown in FIG. 2, and structures and functions of the microscopes are already known by those skilled in the art, thus will not be elaborated here.

Furthermore, in the embodiments of the present disclosure, the computational process for recovering a three-dimensional structure of the sample is achieved via processing an acquired image in different depths formatted simultaneously by the above system. First, an extraction for the acquired image is performed. Since areas behind each micro lens may correspond to information of 5*5 different depths, information corresponding to a same depth may be extracted firstly to form depth images. With a magnification of the second stage 4f system 501, each micro lens may image the sample with a diffraction limit resolution and will not cause any loss of spatial resolution. When information of the 25 depths is extracted, a set of imaging stacks corresponding to different depths of the sample may be obtained according to an order of depths. Further, a computational reconstruction of a high-resolution three-dimensional image may be achieved by a traditional three-dimensional deconvolution method.

In systems according to embodiments of the present disclosure, attentions should be paid on matches of numerical apertures of different stages in systems. When passing through the beam-splitting grating and the micro lens array, a numerical aperture provided by the objective lens itself may experience an expanding of the numerical aperture on each of their respective dimensions; expanding degrees of both of them need to be kept correspondence with each other so as to avoid aliasing and under-sampling on the final image plane.

In systems according to embodiments of the present disclosure, attentions should be paid on determinations of magnification factors of different stages of 4f systems. To avoid loss of spatial resolution and to take full advantage of the pixels of the image sensor, magnification factors of different stages need to be accurate, imaging and sampling in different depths need to be performed by the micro lens at a diffraction limit resolution, and information in different depths need to exactly correspond to pixels on certain locations of the image sensor which corresponds to the micro lenses. When the magnification factors of the 4f systems are not matched, the imaging spatial resolution may be decreased and aliasing of information from different depths may occur.

In summary, the rapid three-dimensional microscope imaging system according to embodiments of the present disclosure may acquire high resolution, high accuracy three-dimensional data of the sample by one camera via one time of exposure. The system achieves a multi-depth simultaneously acquiring system based on one camera for the first time and has a wide application prospect. Compared with traditional scanning methods, optical design and computational reconstruction are combined in the system, acquisition time is reduced and bleaching of fluorescence samples is avoided.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples.

Although embodiments of present disclosure have been shown and described above, it should be understood by those skilled in the art, changes, alternatives, and modifications can be made to the embodiments without departing from spirit, principles, and scope of the present disclosure, the scope of the present disclosure is limited by the claims and its equivalents.

What is claimed is:

1. A rapid three-dimensional microscopic imaging system, comprising:
   a microscope, configured to magnify a sample and to image the sample onto an image plane of the microscope so as to output from an output port of the image plane;
   a field diaphragm, disposed at an output image plane of the microscope and configured to restrict a field range of imaging;

a narrow-band filter, disposed between lenses of a first stage 4f system behind the field diaphragm and configured to perform narrow-band filtering on information of the sample;

a beam-splitting grating, configured to duplicate a beam after passing through the first stage 4f system into beams with different angles;

a lens array with different focal length, disposed at a Fourier plane of a second stage 4f system, and configured to perform different phase modulation to each beam with different angle;

a micro lens array, dispose at an image plane of the second stage 4f system and configured to modulate the beams with different angles that pass through the lens array with different focal length respectively to different spatial locations at a back focal plane of the micro lens array respectively; and an image sensor, disposed at an image plane of an imaging camera lens or an image plane of a third stage 4f system, and configured to record an image corresponding to the modulated beams at the back focal plane of the micro lens array;

wherein the beam-splitting grating and the narrow band filter are coupled through the first stage 4f system, the narrow-band filter is configured to perform wave band interception and the beam-splitting grating is configured to perform beam information duplication.

2. The rapid three-dimensional microscopic imaging system according to claim 1, wherein, the microscope is a wide-field microscope.

3. The rapid three-dimensional microscopic imaging system according to claim 1, wherein, the microscope is a wide-field fluorescence microscope.

4. The rapid three-dimensional microscopic imaging system according to claim 1, wherein, the beam-splitting grating is disposed at an image plane of the first stage 4f system.

5. The rapid three-dimensional microscopic imaging system according to claim 1, wherein, a distribution of the lens array with different focal length corresponds to a spatial location of the Fourier plane of the second stage 4f system.

6. The rapid three-dimensional microscopic imaging system according to claim 3, wherein, a fluorescence image output from the microscope is modulated via the micro lens array with a diffraction limit resolution.

7. The rapid three-dimensional microscopic imaging system according to claim 1, further comprising:

a reconstructing module, configured to obtain an imaging stack corresponding to each depth of the sample by extracting pixels of the image recorded by the image sensor, and to reconstruct a three-dimensional structure of the sample by using the imaging stacks.

8. The rapid three-dimensional microscopic imaging system according to claim 1, wherein, the first stage 4f system, the second stage 4f system, and the third stage 4f system have lenses or imaging camera lenses respectively.

9. The rapid three-dimensional microscopic imaging system according to claim 1, wherein, the image sensor is a Scientific Complementary Metal-Oxide-Semiconductor SCMOS monochrome sensor or Charge Coupled Device CCD sensor, or Complementary Metal-Oxide-Semiconductor CMOS sensor.

10. The rapid three-dimensional microscopic imaging system according to claim 1, wherein, the number of beams split by the beam-splitting grating is adjustable.

11. The rapid three-dimensional microscopic imaging system according to claim 10, wherein, the number of lenses of the lens array with different focal length matches to the number of beams split by the beam-splitting grating.

* * * * *